July 15, 1969  E. C. BRYANT  3,455,764
TIRE TREADING APPARATUS
Filed April 21, 1966  5 Sheets-Sheet 1
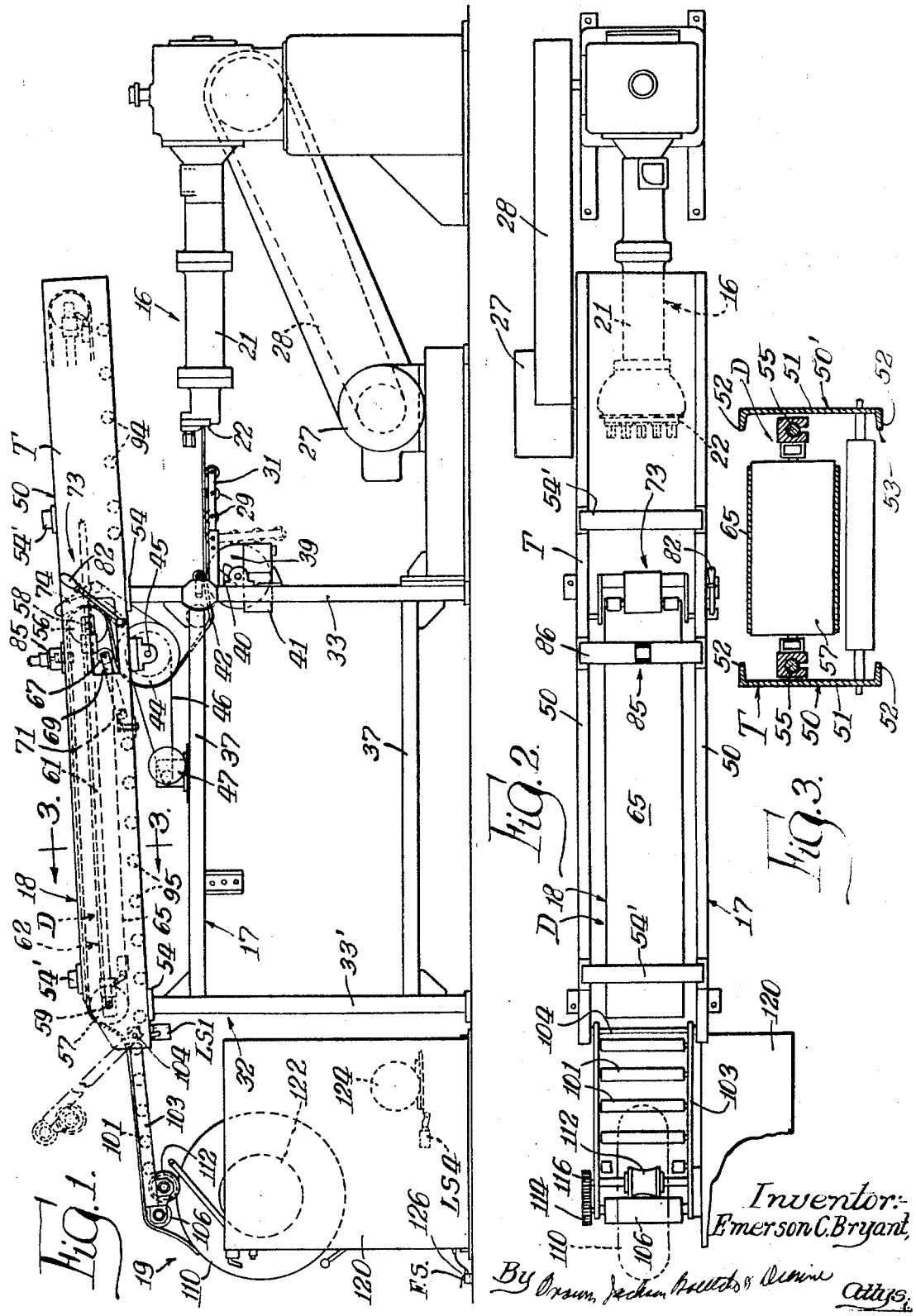
Inventor:
Emerson C. Bryant,
By [signature]
Attys.

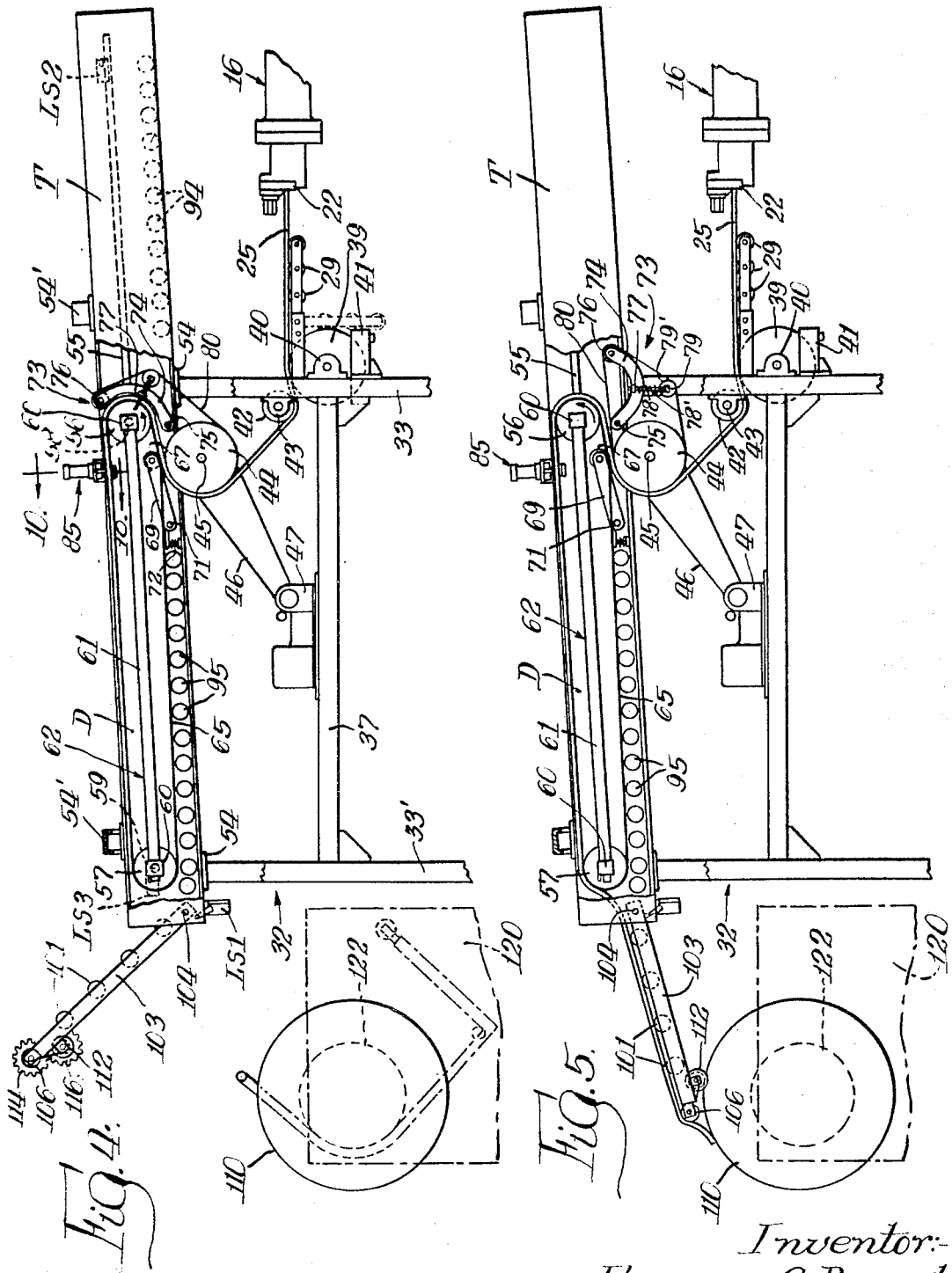

July 15, 1969  E. C. BRYANT  3,455,764
TIRE TREADING APPARATUS
Filed April 21, 1966  5 Sheets-Sheet 3
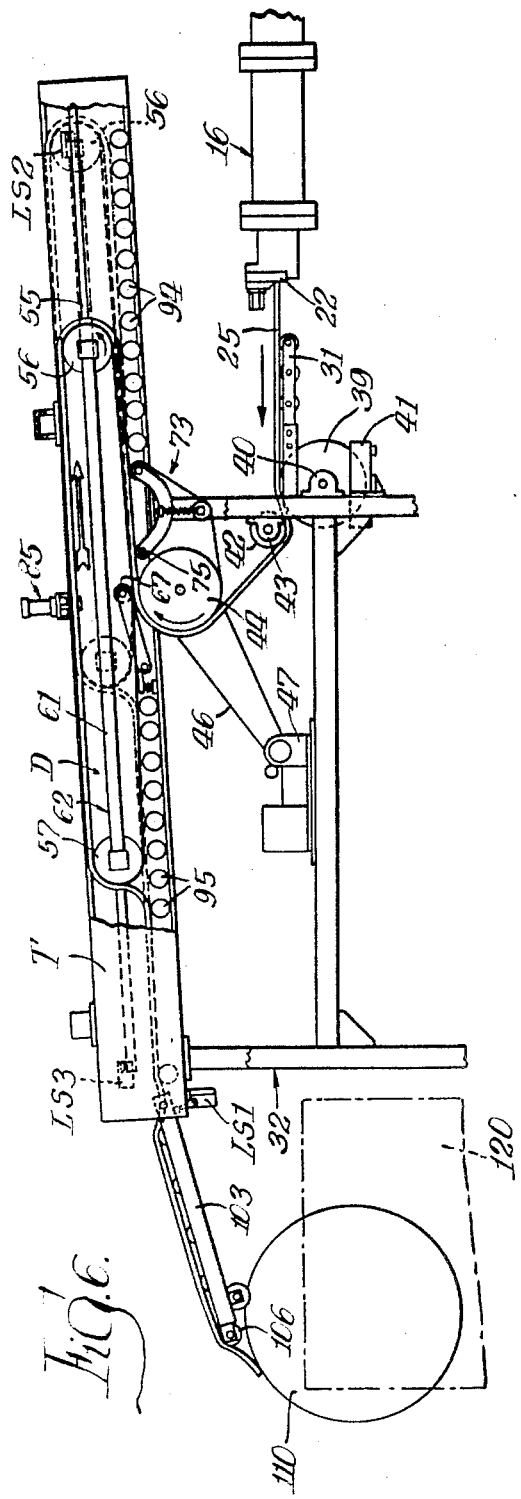
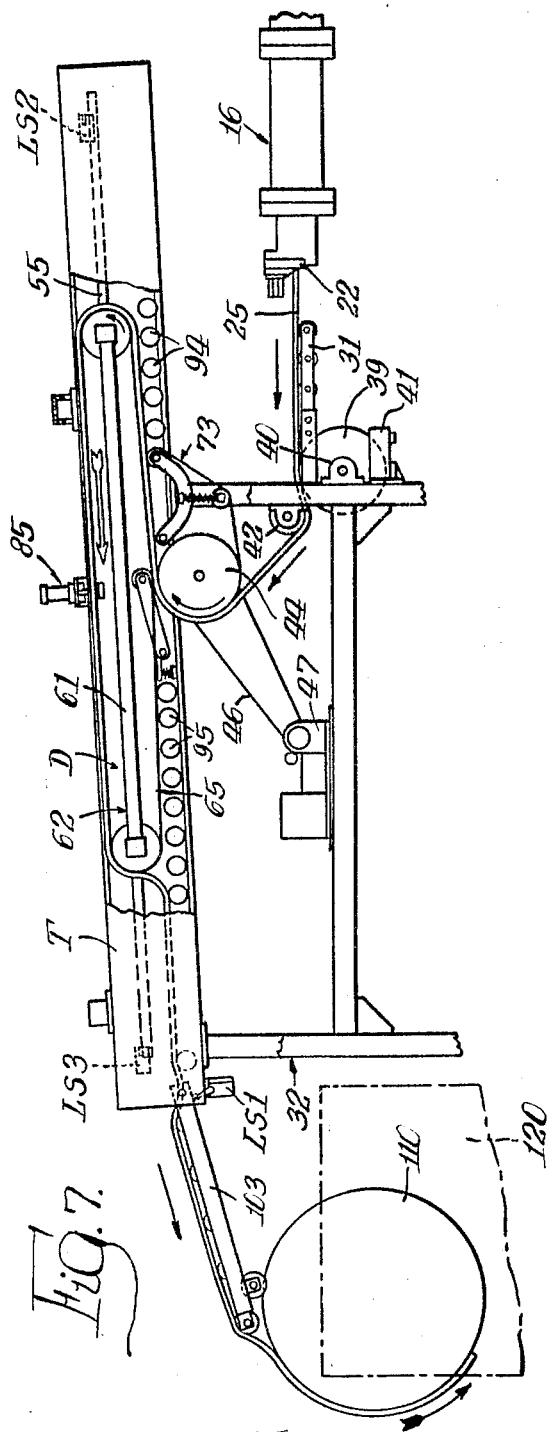
Inventor:—
Emerson C. Bryant,
By Onsan, Jadwin, Boetles & Dunn
Attys.

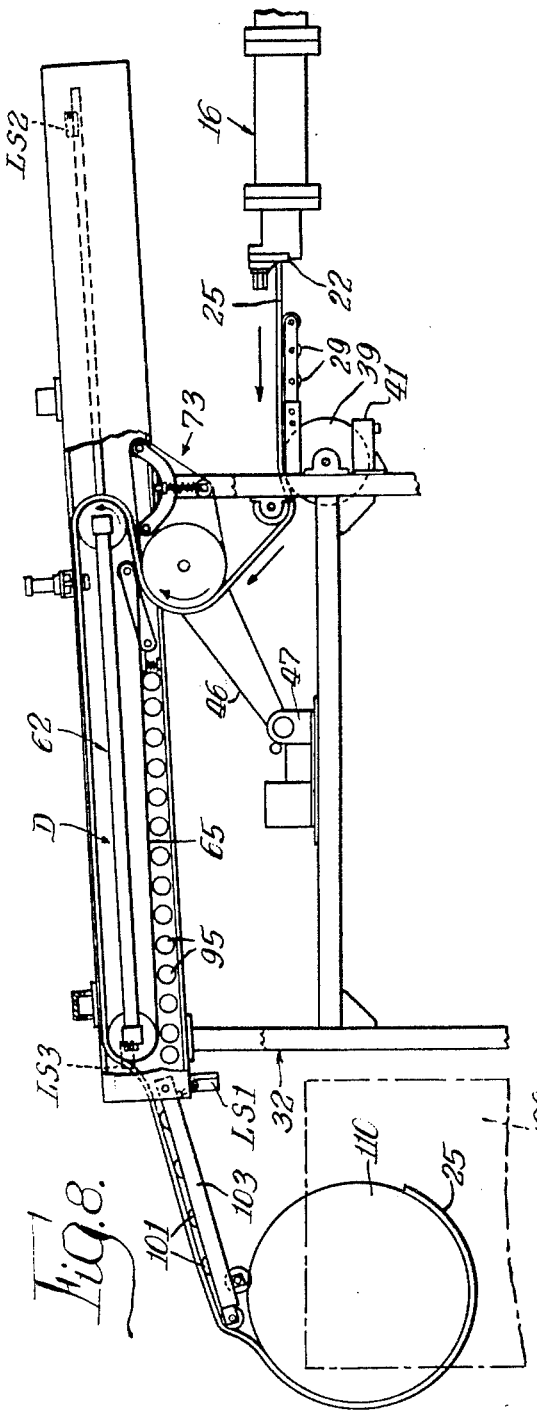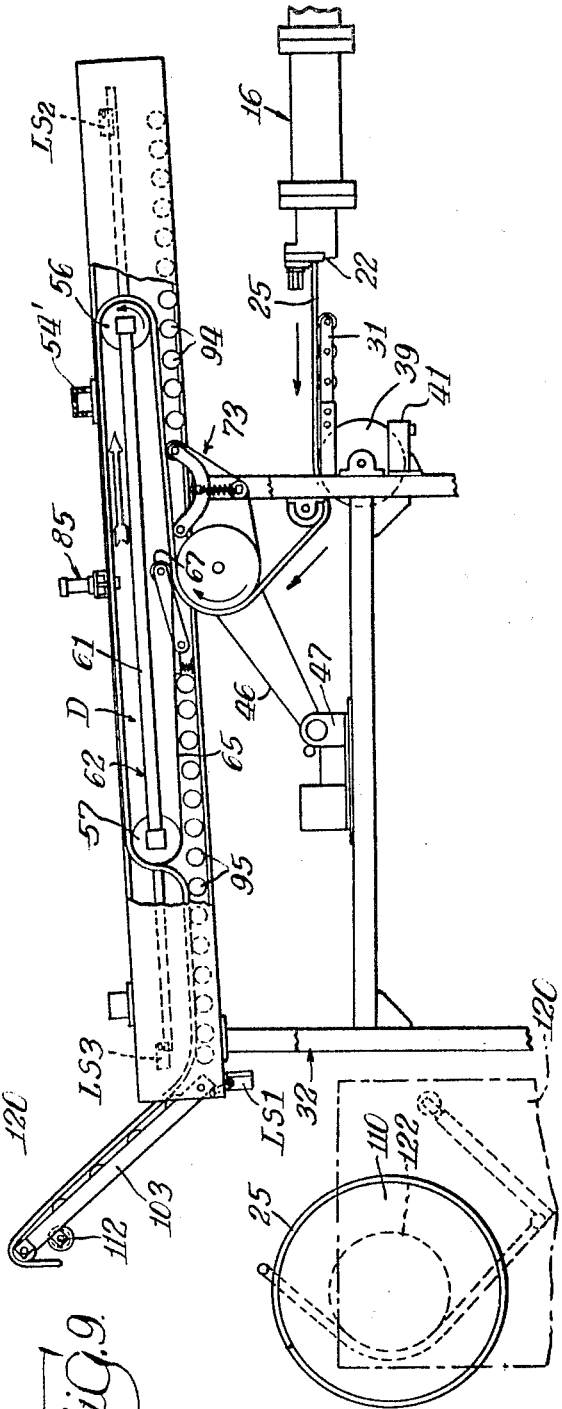

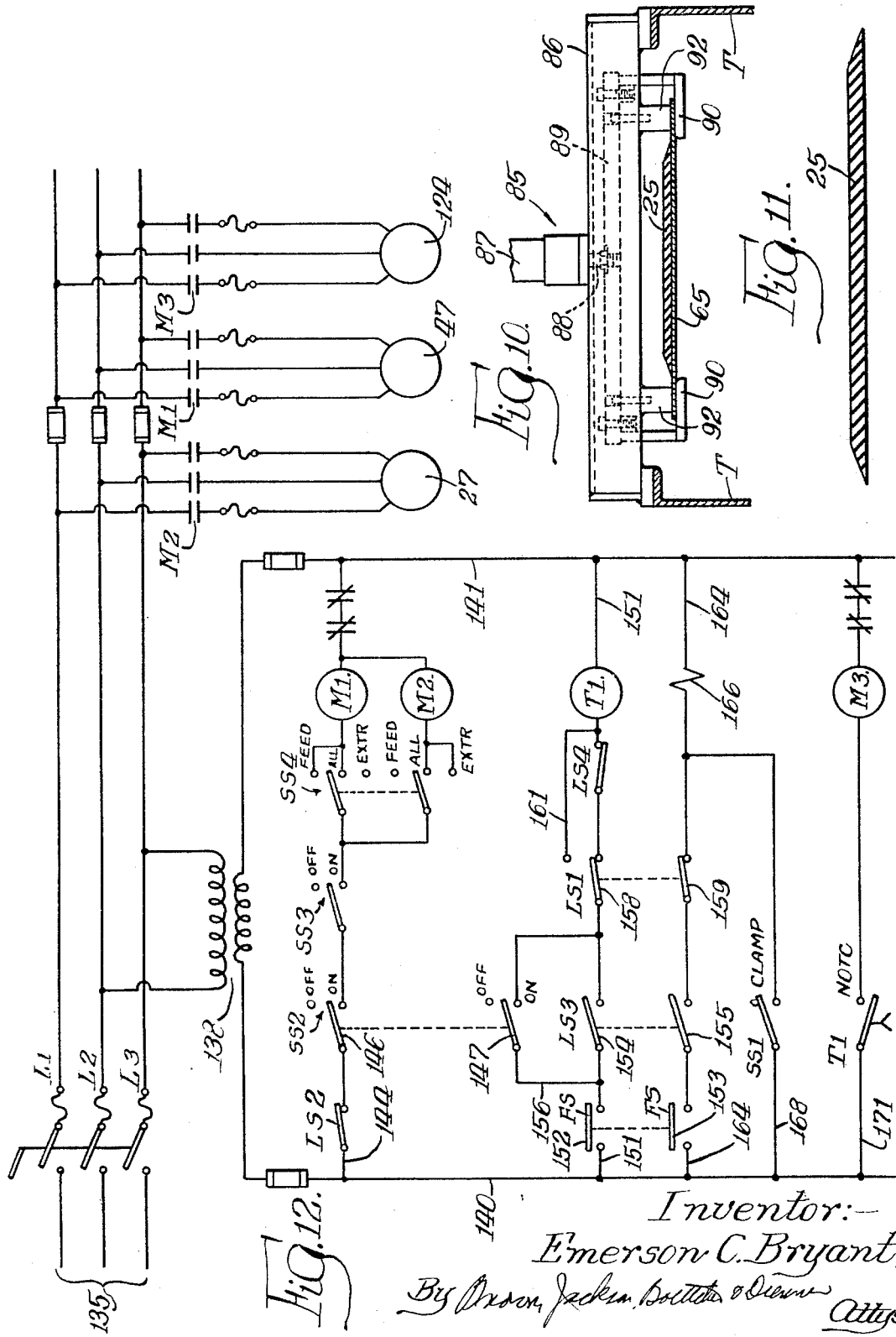

United States Patent Office 3,455,764
Patented July 15, 1969

3,455,764
TIRE TREADING APPARATUS
Emerson C. Bryant, South Bend, Ind., assignor to National-Standard Company, Niles, Mich., a corporation of Delaware
Filed Apr. 21, 1966, Ser. No. 544,210
Int. Cl. B29h 17/02
U.S. Cl. 156—405          16 Claims The present invention relates to an apparatus feeding tire tread stock to a tire carcass for applying a tire tread thereto, and has utility in the fabrication of original tires as well as in re-capping a tire carcass from which a worn or no longer useful tire tread has been removed.

According to the present invention suitable tread stock material is discharged in the form of an endless tread strip of desired and predetermined cross-sectional configuration for a tire tread from an extruder to accumulating means of the apparatus of the invention. The strip material from the accumulating means is fed to a carcass supported on a tread applicator device. The strip of tread material is applied around the crown of the carcass and is then severed from the supply and the adjacent ends of the strip around the carcass are joined to complete the tread. The tread stock material issuing from an extruder has little mechanical strength and may readily deform which is not desirable in that a tread applied to a carcass will not be of the desired dimensional characteristics.

In view of the foregoing it is an important object of the present invention to provide for maintaining the dimensional stability of the strip of tread stock from the extruder to the tread applicator device.

Of particular importance, among several novel aspects of the apparatus, is an improved tread material accumulator for accumulating tread material continuously fed from a supply source, such as an extruder, during the intermittent application of tire treads to successive tire carcasses. The intermittent application of tread stock to successive tire carcasses at a tread applicator requires stopping of the feed of the tread material at the tread applicator when changing from a completed tire to which a tread has been applied to the succeeding carcass to be capped. It is desirable not to start and stop the flow of the tread strip stock from an extruding machine with each change from a completed tire to a succeeding carcass in order to maintain the tread material of desired and accurate configuration. Accordingly, to permit the continuous discharge of the strip tread stock from the extruding machine, and at the same time to permit the starting and stopping of the flow of the strip tread stock at the tread applicator, it is necessary to interpose accumulating means between the extruder and the tread applicator. As aforenoted it is important that the strip of tread material not be subjected to any forces which will significantly alter its desired dimensional characteristics.

Another object of the present invention is to provide an improved strip tread stock accumulator means which accomodates the above situation.

Another object of the invention is to provide an improved dolly means for the accumulating means which reciprocates to-and-fro to intermittently pick up strip tread stock from the extruder and pay out strip tread stock to the tread applicator device. The dolly means preferably comprises two spaced rolls rotatably mounted at opposite ends of an intermediate traveling frame, and around which rolls travels an endless belt.

Another object is to provide dolly means for the accumulating means in which the drive for reciprocating the dolly means in one direction is transmitted by drive roll means between which the strip of tread stock and belt are driven while the machine is in the act of accumulating the strip of tread stock in the accumulating means.

Another object is to incline the travel of the dolly means so that gravity will reciprocate or assist in reciprocating the travel of the dolly means in the opposite direction, in the feeding of the strip tread stock toward the tread applicator and while the drive race means continues to feed strip tread stock to the accumulating means from the extruder.

Another object is to provide improved feed mechanism to facilitate the initial feeding of the strip of tire tread stock around the intake end of the dolly means in the initial threading of the tread stock through the machine.

Another object is to provide clamping means for clamping the endless belt of the dolly means at one fixed point of the machine, while the dolly means is traveling upwardly in the act of accumulating strip tread stock.

Another object is to provide releasing means for releasing the clamping means momentarily before energization of the drive motor of the tread applicator.

Another object is to provide improved feed conveyor means at the tread applicator of the machine for governing the power feed of the strip tread stock out over the crown of a tire carcass at the tread applicator.

Another object is to provide an improved arrangement of limit switches for governing the travel of the dolly means of the accumulator means and of the strip tread stock.

The invention will now be described in connection with the accompanying drawings in which—

FIGURE 1 is a side elevational view of the entire retreading machine.

FIGURE 2 is a plan view of the machine.

FIGURE 3 is a transverse sectional view through the machine taken approximately on the plane of the line 3—3 of FIGURE 1.

FIGURES 4 to 9 inclusive are fragmentary side elevational views of the intermediate accumulator portion of the machine taken on a slightly larger scale than FIGURE 1, and showing different stages of the operating cycle.

FIGURE 10 is a transverse sectional view through clamp means taken on the plane of the line 10—10 of FIGURE 4.

FIGURE 11 is a transverse sectional view through a typical tread strip stock; and FIGURE 12 is a circuit diagram of the electrical portion of the machine.

Referring now to FIGURE 1, the apparatus there shown comprises basically three units disposed in substantially lengthwise alignment:

(1) An extruding machine 16 of known construction disposed at the right, which extrudes the tread stock in a continuous endless strip;
(2) The intermediate accumulator frame portion 17 of the machine which mounts the accumulator means 18; and
(3) The tread applicator means 19 of largely known construction at the left where the strip of tread stock is applied around the crown of a tire carcass.

The extruder 16 as in known construction comprises internal apparatus which heats and conveys macerated tire tread stock to a discharging feed screw enclosed within a feed tube 21 having a discharge head 22 at its outer end. The tread material issues through a die at the head 22 in the form of a continuous tread strip designated 25. The die at head 22 is selected to provide strip tread stock of desired cross-sectional configuration, such, for example, as shown in FIGURE 11 for a tire tread for a tire carcass. The extruder 16 and the feed screw within the feed tube 21 are driven from any suitable power source, such as an electric motor 27, through a belt drive 28. The die at the discharge head 22 is preferably suitably removably mounted so that dies for any desired tread stock configurations may be readily substituted one for the other.

From the discharge head 22 the strip of tread stock 25 passes over conveying means comprising a set of rotatable conveyor rollers 29 freely rotatably mounted in juxtaposed relation between cantilever arms 31 projecting from the frame 32. The rollers 29 are spaced with respect to each other to support the strip 25 and prevent it from sagging to maintain the dimensions of the strip stable and substantially of the configuration issuing from the die of the extruder. If desired an endless belt could be substituted for the rollers 29. The cantilever arms 31 and their rollers can be swung down to afford more space for changing dies in the head 22 of the extruder. The frame 32 comprises four (4) corner legs 33–33' between which extend horizontal stringers 37. From the conveyor rollers 29 the strip stock 25 passes over a cement or adhesive transfer roll 39 rotatably supported in bearings 40 mounted on the two right hand frame legs 33. The lower peripheral portion of the cement transfer roll 39 passes through a pan or tank 41 containing liquid cement or adhesive which the transfer roll 39 applies to the under surface of the strip of tread stock 25. From the transfer roll 39 the strip of tread stock 25 passes under a guide roll 42 having bearing support in bearings 43 secured to the back sides of the vertical frame legs 33. From the guide roll 42 the strip stock 25 passes upwardly around and over the top of a relatively large drive roll 44 of drive roll means hereinafter described in greater detail. The drive roll 44 has its axis shaft 45 suitably mounted on the machine frame. The drive roll 44 is driven by belt 46 from an electric motor 47 having variable selective speed characteristics, or through variable speed drive mechanism having selectable speeds to provide desired speed of rotation of drive roll 44.

Extending along the top of the machine is a long trackway frame T of box-like cross-section within which the accumulator dolly means D has to-and-fro movement. As shown in the sectional view of FIGURE 3, this trackway T comprises two spaced channel members 50, 50' having vertical web portions 51 and inwardly facing top and bottom flanges 52, spaced apart to leave top and bottom slot like openings 53 therebetween. These channel members 50, 50' are secured to pads 54 on the upper ends of the vertical frame legs 33, 33', and are cross connected at their upper edges by transverse bars 54'. It will be noted that this trackway frame has a slight downward inclination from right to left, of approximately 5°, so that gravity will tend to propel the dolly means D downwardly toward the left or rear end of the trackway at which tread applicator means 19 is located.

Carried by the channel members 50 are lengthwise guide members, preferably in the form of circular rods 55, secured adjacent their opposite ends to the webs of the channel members. Movable along these rods 55 is the carriage for dolly means D comprising spaced front and rear rollers 56 and 57 having their axles 58 and 59 mounted in bearing bushings 60 which have free sliding engagement with the guide rods 55. These bushings 60 are fastened together at fixed fore and aft spacing by side frame stringers 61 of the dolly frame 62. The circular rods extend almost the entire length of the channel members 50, 50' to accommodate a substantial range of to-and-fro longitudinal sliding movement of the dolly means D.

The dolly means D further comprises an endless dolly belt 65 composed of canvass, rubberized webbing or other suitable material trained over the end rollers 56 and 57. This belt 65 is wider than the strip of tread stock 25 for accommodating the strip of tread stock thereon and leaving side edge portions of belt 65 exposed for purposes to be described. The drive roll 44, as previously noted, comprises one component of drive roll means for the strip of tread stock 25 and dolly belt 65, and such drive means further includes an inner transverse pressure roll 67 which extends transversely through the loop of the dolly belt 65 and is spring urged downwardly against the inner surface of the dolly belt. The ends of this pressure roll are rotatably mounted in pivotally swinging arms 69 which are pivoted at 71 to the channel members 50. Springs 72 act upwardly on the opposite ends of arms 69 to press the roll 67 downwardly against the inner side of the dolly belt 65 substantially directly above the point where the dolly belt and the strip stock come together adjacent to the uppermost peripheral point of the drive roll 44. It is at this point that the drive roll 44 transmits its drive frictionally to the strip of tread stock 25 and to the dolly belt 65.

To facilitate the initial feeding of the strip of tread stock from the drive roll 44 up and around the belt 65 at the front end roll 56 of the dolly in the operation of first threading the strip 25 through the machine, there may be provided an initial feed or guide mechanism 73, which swings between an upper operating position (FIGURE 4) downwardly into a normal non-operating position (FIGURE 5). This mechanism comprises a U-shaped arm 74 at each side of the machine, pivoted at 75 to each of the channel members 50. Pivoted between the other ends of the spaced arms 74 is a feed belt roller 76. Located at the center of each of the arms 74 is a guide 77 through which slides a stem 78 carrying a bearing 79 at its end. A compression spring 78' surrounding the stem tends to thrust the bearing 79 outwardly. Extending transversely between the opposite bearings 79 is another feed belt roller 79'. An endless feed belt 80 passes from direct contact with the drive roll 44 outwardly to the swinging roller 76, thence downwardly over the back side of the spring pressed roller 79' and back to the bottom of the drive roller 44.

To start the threading of the strip stock 25, a lead portion of the strip from drive roll 44 is layed onto belt 80 of the feed mechanism 73 in the position of the latter shown in FIGURE 5. The feed mechanism 73 is then moved to the position shown in FIGURE 4 by manipulating handle 82 (seen in FIGURE 1) to place the strip material around belt 65 at roller 56 and onto the upper run of belt 65. After this threading operation is completed the feed mechanism 73 is swung down into the retracted position shown in FIGURE 5 so that it will not obstruct the endwise movement of the dolly D. The aforementioned drive roll means may be energized to feed the tread strip material onto the belt 65 toward the discharge end of the accumulating means.

Referring now to FIGURES 1 and 10 it will be seen that on the top of the trackway frame at a point substantially above the drive roll 44 there is provided belt clamp means 85, which is operable to grip the side edges of the endless dolly belt 65 laterally outwardly of the strip 25 on the belt along its top run when the dolly D is to start accumulating stock. The clamp means 85 comprises a transverse supporting bar 86 having its ends secured to the trackway frame. Rising from the center of this supporting bar 86 is a compressed air cylinder 87 having its piston rod 88 extending downwardly therefrom to mount an inverted U-shaped clamping member 89 thereon. The vertical side legs of this clamping member 89 have inwardly turned clamping flanges 90 which lie just below the side edges of the upper run of the dolly belt 65. The clamping member 89 in its lower retracted position does not exert any clamping action on the dolly belt. Upon the energization of the compressed air cylinder 87, however, the clamping flanges 90 raise both side edges of the belt up into clamping engagement against the stationary clamping surfaces 92 carried in the trackway frame structure 86. It is at this time of clamped engagement that the dolly means D moves upwardly in the action of accumulating strip stock.

Such movement of the dolly is effected by drive imparted by driving means comprising drive roll 44 and the pressure roll 67 to the body of the strip stock and belt 65 at the bite of the driving means in a direction toward the right; and thereby through belt 65 pull the left hand dolly roller 57 toward the right. The aforementioned clamping means 85 holds the upper run of the belt to provide a reaction point for the driving force of the driving means defined by rolls 44 and 67. Such drive continues to impart movement of the dolly towards the right as long as the clamp 85 is in gripping relation with the top run of the dolly belt 65. Such movement afforded by such differential drive will continue to accumulate strip stock in the accumulator means until the clamp means 85 is released, or until the right hand end of the dolly strikes an end limit switch LS2, for stopping the extruder 16 (see FIGURE 6).

When the dolly means D moves to the right, as shown in FIGURE 6, the lower run of the stock strip, unless supported, may tend to sag down objectionably altering the desired predetermined dimension thereof. To prevent this sagging and retain the dimensional stability of the strip of tread stock, first supporting means comprising a series of conveyor rollers 94 are rotatably mounted in close parallel relation between the trackway beams at the right hand end of the trackway. In lieu of such conveyor rollers, an endless conveyor belt may be utilized to support any sagging portion of the stock strip.

At the left hand portion of the trackway frame, second supporting means comprising a similar series of conveyor rollers 95 is provided to support the stock strip 25 being layed off the upper run of belt 65 when the dolly is moving to the right as shown in FIGURE 6. Similarly, an endless conveyor belt may be substituted for these conveyor rollers 95.

As the stock strip passes to the left from conveyor rollers 95 toward the tread applicator, the strip stock is supported by a series of rollers 101 mounted in an upwardly swinging feed conveyor frame 103 pivoted at 104 to the main frame at the tread applying end 19 of the machine. Again an endless belt may be used rather than rollers 101 and indeed a single continuous endless belt could be employed for both sets of rollers 95 and 101. The outer end of swinging conveyor frame supports a conveyor roller 106 over which the strip stock passes downwardly to its tread applying position on the tire carcass 110. As best seen in FIGURES 2 and 3 a cupped drive roller 112 is rotatably mounted on the underside of frame 104. The cupped rollers 112 is adapted to be rotated by and when engaged with the peripheral surface of the tire carcass. This drive roller 112 is connected by gears 114–116 with the feed roller 106 so that the strip stock will be fed to the surface of the crown of the tire carcass at the same linear speed of travel of the peripheral surface of the carcass. The tire carcass is supported between spaced side plates 120 on a hub structure 122 of the tread applicator and is arranged to be driven by an electric motor 124. This motor drive is controlled by a foot pedal switch 126 readily accessible to the operator standing at the tread applying station of the machine. The completed tires and tire carcass can be readily removed and substituted by swinging the feed conveyor frame 103 upwardly, as shown in FIGURE 4.

When wider or narrower tires call for wider or narrower strip tread stock, it is a simple matter to substitute the appropriate die or discharge head 22 in the outlet of the extruding machine 16. The threading of the new size of stock can be greatly facilitated by cutting the rubber in front of the extruder head, changing the die size, and simply attaching the end of the new size to the end of the preceding size that had been going through the machine.

Referring now to FIGURE 12 showing the circuit diagram of the apparatus, the main current source consists of a 220 volt, 3 phase alternating current supplied over leads L1, L2 and L3. These leads are connected to the extruder drive motor 27 through switch M2; to the feed drive motor 47 through switch M1; and to the tread applicator motor 124 through switch M3.

Branching off one phase of these leads, through a transformer 138, is a 110 volt single phase control circuit consisting of two parallel leads 140–141. A first cross conductor 144 between these two leads supplies the current for actuating the switch M1 for the feed motor 47, and also supplies the current for actuating the switch M2 for the extruder motor 27. Interposed in this cross conductor 144 is the aforementioned limit switch LS2, which is situated at the outer end of the trackway T, where it is moved to open circuit position by the dolly D when the latter reaches the outer limit of its accumulating travel.

Also interposed in this cross conductor 144 is one blade 146 of a manually operated double bladed off-on selector switch SS2 located at and associated with the tread applicator 19. From here the conductor 144 extends to a manually operated off-on selector switch SS3 associated with the accumulator, and from there it continues on to a manually operated two bladed three position selector switch SS4. In its upper position this switch SS4 only energizes the feed motor switch M1, in its lower position it only energizes the extruder motor switch M2; while in the intermediate position, it energizes both motor switches M1 and M2. Thus, it will be seen from the foregoing that when the dolly means D reaches the outer limit of its accumulating travel, its act of opening the limit switch LS2 will automatically stop the extruder motor 27 and the feed drive motor 47.

Another cross conductor 151 extends to one switching element 152 of a foot treadle switch FS, and thence to one blade 154 of a double bladed limit switch LS3 which responds to the empty accumulator dolly D at the lower limit of its travel.

Shunting this blade 154 of the limit switch LS3 is a bridging circuit 156 in which is interposed the second blade 147 of the aforementioned double blade off-on selector switch SS2 of the tread applicator. The simultaneous operation of the two blades 146–147 to OFF position open the circuit of the cross conductor 144 and closes the shunt circuit 156 at the same time.

From the blade 154 of the limit switch LS3 the conductor 151 continues to the upper blade 158 of the double-bladed limit switch LS1, which responds to the position of the arm 103 of tread strip guide means for guiding the tread strip from the accumulating means to the tread applicator. When the applicator arm 103 is in its down position (FIGURES 5–7) the limit switch LS1 is also in its down position, for continuing the circuit through blade 158 to the switch LS4, which signals the position of the drive motor of the tread applicator. Thus the tread applicator is prevented from being run on high speed with the applicator arm 103 down. When the applicator arm 103 is in its upper position the switch LS1 is in its upper position, which then continues the circuit through the by-pass shunt circuit 161 around the tread applicator motor signal switch LS4. The circuit thence continues through a tuner unit T to the other control lead 141. The switch LS1 also holds the brake means 85 engaged when the applicator arm 103 is up.

Still another cross conductor 164 extends from control lead 140 to the second element 153 of the foot treadle switch FS, which moves simultaneously with the first switch element 152. The conductor 164 then extends to the second switching element 155 of the limit switch LS3, which responds to the empty accumulator dolly means D. The conductor 164 then continues to the second switching element 159 of the limit switch LS1, responsive to the applicator arm 103. Thence the conductor extends to the unclamp solenoid 166. This solenoid is operative to release the air pressure from the clamp cylinder 87 for releasing the brake means 85.

Another conductor 168 leads from the left hand control lead 140 to the manually operated selective clamp switch SS1 and thence to the unclamping solenoid 166. This latter conductor 168 extends in shunt around the foot switch element 153 and limit switch element 159. Thus, the unclamping solenoid 166 can be manually operated to release the clamping brake means 85 at any time.

Still another cross conductor 171 extends to switch contact T1 of tuner 9 for closing switch M3 which delays energization of tread applicator motor 124 for an instant after release of brake means 85.

The three manually operated switches SS1, SS3 and SS4 are mounted in a convenient location at the front of the machine (FIGURE 1) for facility of manual operation.

The foregoing described apparatus and control systems provide for threading of strip tread stock from the extruder 16 into the accumulating means D and to tread applicator 19. Assuming that the accumulating means D is sufficiently filled with tread strip stock actuation of switch FS first serves to release brake means 85 momentarily before energization of motor 124 so that dolly means D by gravity begins to move to the left as viewed in FIGURE 7. The inertia of dolly D is overcome before feed roll means 106 draws the strip stock onto the tire carcass mounted on the tread applicator. The slight initial movement of the dolly D also provides for a small loop of tread stock in advance of the dolly tending to brake the downward movement of dolly means D. The arrangement noted thus serves to prevent any tension being applied to the strip stock and thus maintaining the strip stock dimensionally stable. After a lead end portion of the tread strip stock has been wound into the tire carcass, the strip stock is severed and the ends of such lead portion around the carcass are joined together. Thereupon the applicator arm 103 is swung to the position shown in FIGURE 9 and at which the brake means 85 is actuated to clamp belt 65 of the accumulating means effecting movement of dolly means D to the right, as viewed in FIGURE 9, to again charge the accumulator means with tread strip stock in readiness for feeding of the succeeding lead portions of the tire strip tread material to a succeeding carcass at the tread applicator. The motor 124 of the tread applicator preferably provides two speeds—a slow speed in the feeding of the tread strip material to a tire carcass, and a high speed for stitching the tread strip material to the carcass after swinging of the supporting arms to the position shown in FIGURE 9. As previously noted limit switch LS2 provides for shutting down of the extruder and drive means for the accumulating means should dolly means D travel beyond its maximum right position. Also, should dolly means D travel beyond the desired left hand end position thereof limit switch LS3 will be actuated to deenergize the motor of the tread applicator.

While I have illustrated and described what I regard to be the preferred embodiment of the invention, nevertheless it will be understood that such is merely exemplary and that numerous modifications and rearrangements may be made therein without departing from the invention.

I claim:

1. For use in tire treading apparatus for applying tire treads to tire carcasses embodying supply means for supplying tire tread material in the form of a continuous tread strip of predetermined cross section, and tread applicator means operable intermittently for the application of successive lead end portions of said tread strip to successive tire carcasses, the combination of accumulating means between said supply means and said applicator means comprising dolly means for accumulating tread strip from said supply means during the interval between the application of said successive lead end portions of said tread strip to successive tire carcasses, and for intermittently supplying said tread strip to said tread applicator means for application of said successive lead portions of said tread strip to said successive tire carcasses, first support means providing for maintaining said tread strip dimensionally stable in passing from said supply means to said accumulating means, and second support means providing for maintaining said tread strip dimensionally stable in passing from said accumulating means to said tread applicator means.

2. The accumulating means of claim 1 in which said dolly means comprises an endless belt trained about spaced apart end rollers, and in which said accumulating means includes drive roll means comprising a drive roll about which said tread strip from said supply means is adapted to be trained, and pressure roll means disposed to engage the inner surfaces of said belt opposite said drive roll whereby said drive roll means upon rotation thereof feeds said tread strip from said supply means and imparts movement to said belt for feeding said tread strip onto said belt.

3. The accumulating means of claim 2 characterized by the provision of means for mounting said dolly means for relative to and fro longitudinal movement, and brake means for engaging said belt whereby said drive roll means upon rotation thereof drives said dolly means in one longitudinal direction for accumulating tread strip in said accumulating means.

4. The accumulating means of claim 3 in which said mounting means is inclined downwardly toward said tread applicator means, whereby upon release of said brake means said dolly means moves by gravity toward the lower end of said mounting means for movement of said tread strip outwardly of said accumulating means towards said tread applicator means.

5. The accumulating means of claim 4 characterized by the provision of tread strip guide means for guiding the tread strip to the crown of a tire carcass at said tread applicator means.

6. The accumulating means of claim 5 in which said tread strip guide means comprises a feed roll for feeding said tread strip to a tire carcass, and drive means for said feed roller including a drive roller for engaging the periphery of the tire carcass for rotation thereby, whereby said feed roll delivers said tread strip to the crown surface of said tire carcass at the speed of rotation of said surface of said carcass.

7. The accumulating means of claim 4 characterized by the provision of tread applicator drive means energizable for rotating said tread applicator means and means for releasing said brake means momentarily prior to energization of said tread applicator drive means.

8. For use in tire treading apparatus for applying tire treads to tire carcasses embodying supply means for supplying tire tread material in the form of a continuous tread strip of predetermined cross section, and tread applicator means operable intermittently for the application of successive lead end portions of said tread strip to successive tire carcasses, the combination of accumulating means between said supply means and said applicator means comprising dolly means for accumulating tread strip from said supply means during the interval between the application of said successive lead end portions of said tread strip to successive tire carcasses, and for intermittently supplying said tread strip to said tread applicator means for application of said successive lead portions of said tread strip to said successive tire carcasses, said dolly means comprising an endless belt trained about spaced apart end rollers, means for mounting said dolly means for relative to and fro longitudinal movement, drive roll means comprising a drive roll about which said tread strip from said supply means is adapted to be trained, and pressure roll means disposed to engage the inner surface of said belt opposite said drive roll whereby said drive roll means upon rotation thereof feeds said tread strip from said supply means and imparts movement to said belt for feeding said tread strip onto said belt.

9. The accumulating means of claim 8 characterized by the provision of brake means for engaging and braking said belt whereby said drive roll means upon rotation thereof drives said dolly means in one longitudinal direction for accumulating tread strip in said accumulating means.

10. The accumulating means of claim 9 in which said mounting means is inclined downwardly toward said tread applicator means, whereby upon release of said brake means said dolly means moves by gravity toward the lower end of said mounting means for movement of said tread strip outwardly of said accumulating means.

11. The accumulating means of claim 10 characterized by tread applicator drive means energizable for rotating said tread applicator, means for releasing said brake means momentarily before energization of said tread applicator drive means for applying said tread stock to a tire carcass to provide a loop of said tread stock ahead of said dolly means to brake movement thereof toward the lower end of said mounting means.

12. The accumulating means of claim 9 characterized by the provision of limit switch means at the upper end of said mounting means which when engaged by said dolly means de-energizes said drive roll means.

13. The accumulating means of claim 10 characterized by limit switch means engageable by said dolly at the lower end of said mounting means for de-energizing said tread applicator drive means.

14. The accumulating means of claim 13 characterized by means for effecting energization of said tread applicator drive means, said means first effecting application of said brake means before imparting drive to said tread applicator drive means.

15. The accumulating means of claim 10 characterized by the provision of tread strip guide means for guiding the tread strip from said accumulating means to the crown of a tire carcass at said tread applicator means.

16. The accumulating means of claim 15 in which said tread strip guide means comprises a feed roll for feeding said tread strip to a tire carcass, and drive means for said feed roller including a drive roller for engaging the periphery of the tire carcass for rotation thereby, whereby said feed roll delivers said tread strip to the crown surface of said tire carcass at the speed of rotation of said surface of said carcass.

References Cited
UNITED STATES PATENTS

| | | | |
|---|---|---|---|
| 1,266,364 | 5/1918 | Wheeler | 156—405 |
| 2,346,439 | 4/1944 | Leguillon | 156—405 |
| 2,473,067 | 6/1949 | Miller | 156—405 X |
| 3,017,312 | 1/1962 | Kraft | 156—406 X |
| 3,071,179 | 1/1963 | Tourtellotte et al. | 156—405 |

HAROLD ANSHER, Primary Examiner

U.S. Cl. X.R.

156—128